United States Patent
Rowlands et al.

(10) Patent No.: US 9,535,848 B2
(45) Date of Patent: Jan. 3, 2017

(54) USING CUCKOO MOVEMENT FOR IMPROVED CACHE COHERENCY

(71) Applicant: NetSpeed Systems, San Jose, CA (US)

(72) Inventors: Joe Rowlands, San Jose, CA (US); Sailesh Kumar, San Jose, CA (US)

(73) Assignee: NetSpeed Systems, San Jose, CA (US)

( * ) Notice: Subject to any disclaimer, the term of this patent is extended or adjusted under 35 U.S.C. 154(b) by 148 days.

(21) Appl. No.: 14/308,370

(22) Filed: Jun. 18, 2014

(65) Prior Publication Data

US 2015/0370720 A1 Dec. 24, 2015

(51) Int. Cl.
G06F 12/12 (2016.01)
G06F 12/08 (2016.01)
G06F 17/30 (2006.01)

(52) U.S. Cl.
CPC ....... *G06F 12/0891* (2013.01); *G06F 12/0817* (2013.01); *G06F 17/3033* (2013.01); *G06F 2212/1041* (2013.01); *G06F 2212/69* (2013.01)

(58) Field of Classification Search
CPC ....... G06F 2209/462; G06F 12/0806–12/0842; G06F 12/1018; G06F 17/3033; G06F 17/30628; G06F 17/30949–17/30952
See application file for complete search history.

(56) References Cited

U.S. PATENT DOCUMENTS

| | | | |
|---|---|---|---|
| 5,432,785 A | 7/1995 | Ahmed et al. | |
| 5,764,740 A | 6/1998 | Holender | |
| 5,991,308 A | 11/1999 | Fuhrmann et al. | |
| 6,003,029 A | 12/1999 | Agrawal et al. | |
| 6,249,902 B1 | 6/2001 | Igusa et al. | |
| 6,415,282 B1 | 7/2002 | Mukherjea et al. | |
| 6,925,627 B1 | 8/2005 | Longway et al. | |
| 7,065,730 B2 | 6/2006 | Alpert et al. | |
| 7,318,214 B1 | 1/2008 | Prasad et al. | |
| 7,590,959 B2 | 9/2009 | Tanaka | |
| 7,603,346 B1 * | 10/2009 | Depelteau et al. | |
| 7,725,859 B1 | 5/2010 | Lenahan et al. | |

(Continued)

FOREIGN PATENT DOCUMENTS

| | | |
|---|---|---|
| CN | 103684961 A | 3/2014 |
| WO | 2014059024 A1 | 4/2014 |

OTHER PUBLICATIONS

Ferdman et al., "Cuckoo directory: A scalable directory for many-core systems," in High Performance Computer Architecture (HPCA), 2011 IEEE 17th International Symposium, pp. 169-180, Feb. 12-16, 2011.*

(Continued)

*Primary Examiner* — Nicholas Simonetti
(74) *Attorney, Agent, or Firm* — Procopio, Cory, Hargreaves & Savitch LLP

(57) ABSTRACT

Example implementations of the present disclosure are directed to handling the eviction of a conflicting cuckoo entry while reducing performance degradation resulting. In example implementations, when an address is replacing another address, the evicted address does not necessarily map to the same places as the new address. Example implementations attempt to conduct a run through of the cache coherent directory with the new entry such that the evicted address can find an empty entry in the directory and fill the empty entry.

18 Claims, 11 Drawing Sheets

(56) References Cited

U.S. PATENT DOCUMENTS

| | | | |
|---|---|---|---|
| 7,808,968 | B1 | 10/2010 | Kalmanek, Jr. et al. |
| 7,917,885 | B2 | 3/2011 | Becker |
| 8,050,256 | B1 | 11/2011 | Bao et al. |
| 8,059,551 | B2 | 11/2011 | Milliken |
| 8,099,757 | B2 | 1/2012 | Riedl et al. |
| 8,136,071 | B2 | 3/2012 | Solomon |
| 8,281,297 | B2 | 10/2012 | Dasu et al. |
| 8,312,402 | B1 | 11/2012 | Okhmatovski et al. |
| 8,448,102 | B2 | 5/2013 | Kornachuk et al. |
| 8,492,886 | B2 | 7/2013 | Or-Bach et al. |
| 8,541,819 | B1 | 9/2013 | Or-Bach et al. |
| 8,543,964 | B2 | 9/2013 | Ge et al. |
| 8,601,423 | B1 | 12/2013 | Philip et al. |
| 8,635,577 | B2 | 1/2014 | Kazda et al. |
| 8,667,439 | B1 | 3/2014 | Kumar et al. |
| 8,717,875 | B2 | 5/2014 | Bejerano et al. |
| 2002/0071392 | A1 | 6/2002 | Grover et al. |
| 2002/0073380 | A1 | 6/2002 | Cooke et al. |
| 2002/0095430 | A1 | 7/2002 | Egilsson et al. |
| 2004/0216072 | A1 | 10/2004 | Alpert et al. |
| 2005/0147081 | A1 | 7/2005 | Acharya et al. |
| 2006/0161875 | A1 | 7/2006 | Rhee |
| 2007/0118320 | A1 | 5/2007 | Luo et al. |
| 2007/0244676 | A1 | 10/2007 | Shang et al. |
| 2007/0256044 | A1 | 11/2007 | Coryer et al. |
| 2007/0267680 | A1 | 11/2007 | Uchino et al. |
| 2008/0072182 | A1 | 3/2008 | He et al. |
| 2008/0120129 | A1 | 5/2008 | Seubert et al. |
| 2008/0147986 | A1* | 6/2008 | Chinthamani et al. ....... 711/141 |
| 2009/0070726 | A1 | 3/2009 | Mehrotra et al. |
| 2009/0268677 | A1 | 10/2009 | Chou et al. |
| 2009/0313592 | A1 | 12/2009 | Murali et al. |
| 2010/0040162 | A1 | 2/2010 | Suehiro |
| 2011/0035523 | A1 | 2/2011 | Feero et al. |
| 2011/0060831 | A1 | 3/2011 | Ishii et al. |
| 2011/0072407 | A1 | 3/2011 | Keinert et al. |
| 2011/0154282 | A1 | 6/2011 | Chang et al. |
| 2011/0276937 | A1 | 11/2011 | Waller |
| 2012/0022841 | A1 | 1/2012 | Appleyard |
| 2012/0023473 | A1 | 1/2012 | Brown et al. |
| 2012/0026917 | A1 | 2/2012 | Guo et al. |
| 2012/0110541 | A1 | 5/2012 | Ge et al. |
| 2012/0155250 | A1 | 6/2012 | Carney et al. |
| 2013/0051397 | A1 | 2/2013 | Guo et al. |
| 2013/0080073 | A1 | 3/2013 | de Corral |
| 2013/0103369 | A1 | 4/2013 | Huynh et al. |
| 2013/0151215 | A1 | 6/2013 | Mustapha |
| 2013/0159944 | A1 | 6/2013 | Uno et al. |
| 2013/0174113 | A1 | 7/2013 | Lecler et al. |
| 2013/0207801 | A1 | 8/2013 | Barnes |
| 2013/0219148 | A1 | 8/2013 | Chen et al. |
| 2013/0263068 | A1 | 10/2013 | Cho et al. |
| 2013/0326458 | A1 | 12/2013 | Kazda et al. |
| 2014/0068132 | A1 | 3/2014 | Philip et al. |
| 2014/0092740 | A1 | 4/2014 | Wang et al. |
| 2014/0098683 | A1 | 4/2014 | Kumar et al. |
| 2014/0115218 | A1 | 4/2014 | Philip et al. |
| 2014/0115298 | A1 | 4/2014 | Philip et al. |

OTHER PUBLICATIONS

L210 Cache Controller Technical Reference Manual, http://infocenter.arm.com/help/index.jsp?topic=/com.arm.doc.ddi0284g/Babhhhia.html, Published 2003-2006, Retrieved Jun. 13, 2016.*

Abts, D., et al., Age-Based Packet Arbitration in Large-Radix k-ary n-cubes, Supercomputing 2007 (SC07), Nov. 10-16, 2007, 11 pgs.

Das, R., et al., Aergia: Exploiting Packet Latency Slack in On-Chip Networks, 37th International Symposium on Computer Architecture (ISCA '10), Jun. 19-23, 2010, 11 pgs.

Ebrahimi, E., et al., Fairness via Source Throttling: A Configurable and High-Performance Fairness Substrate for Multi-Core Memory Systems, ASPLOS '10, Mar. 13-17, 2010, 12 pgs.

Grot, B., Preemptive Virtual Clock: A Flexible, Efficient, and Cost-Effective QOS Scheme for Networks-on-Chip, Micro '09, Dec. Dec. 16, 2009, 12 pgs.

Grot, B., Kilo-NOC: A Heterogeneous Network-on-Chip Architecture for Scalability and Service Guarantees, ISCA '11, Jun. 4-8, 2011, 12 pgs.

Grot, B., Topology-Aware Quality-of-Service Support in Highly Integrated Chip Multiprocessors, 6th Annual Workshop on the Interaction between Operating Systems and Computer Architecture, Jun. 2006, 11 pgs.

Jiang, N., et al., Performance Implications of Age-Based Allocations in On-Chip Networks, CVA Memo 129, May 24, 2011, 21 pgs.

Lee, J. W., et al., Globally-Synchronized Frames for Guaranteed Quality-of-Service in On-Chip Networks, 35th IEEE/ACM International Symposium on Computer Architecture (ISCA), Jun. 2008, 12 pgs.

Lee, M. M., et al., Approximating Age-Based Arbitration in On-Chip Networks, PACT '10, Sep. 11-15, 2010, 2 pgs.

Li, B., et al., CoQoS: Coordinating QoS-Aware Shared Resources in NoC-based SoCs, J. Parallel Distrib. Comput., 71 (5), May 2011, 14 pgs.

International Search Report and Written Opinion for PCT/US2013/064140, Jan. 22, 2014, 9 pgs.

International Search Report and Written Opinion for PCT/US2014/012003, Mar. 26, 2014, 9 pgs.

International Search Report and Written Opinion for PCT/US2014/012012, May 14, 2014, 9 pgs.

Ababei, C., et al., Achieving Network on Chip Fault Tolerance by Adaptive Remapping, Parallel & Distributed Processing, 2009, IEEE International Symposium, 4 pgs.

Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), pp. 1211-1224.

Gindin, R., et al., NoC-Based FPGA: Architecture and Routing, Proceedings of the First International Symposium on Networks-on-Chip (NOCS'07), May 2007, pp. 253-262.

Yang, J., et al., Homogeneous NoC-based FPGA: The Foundation for Virtual FPGA, 10th IEEE International Conference on Computer and Information Technology (CIT 2010), Jun. 2010, pp. 62-67.

* cited by examiner

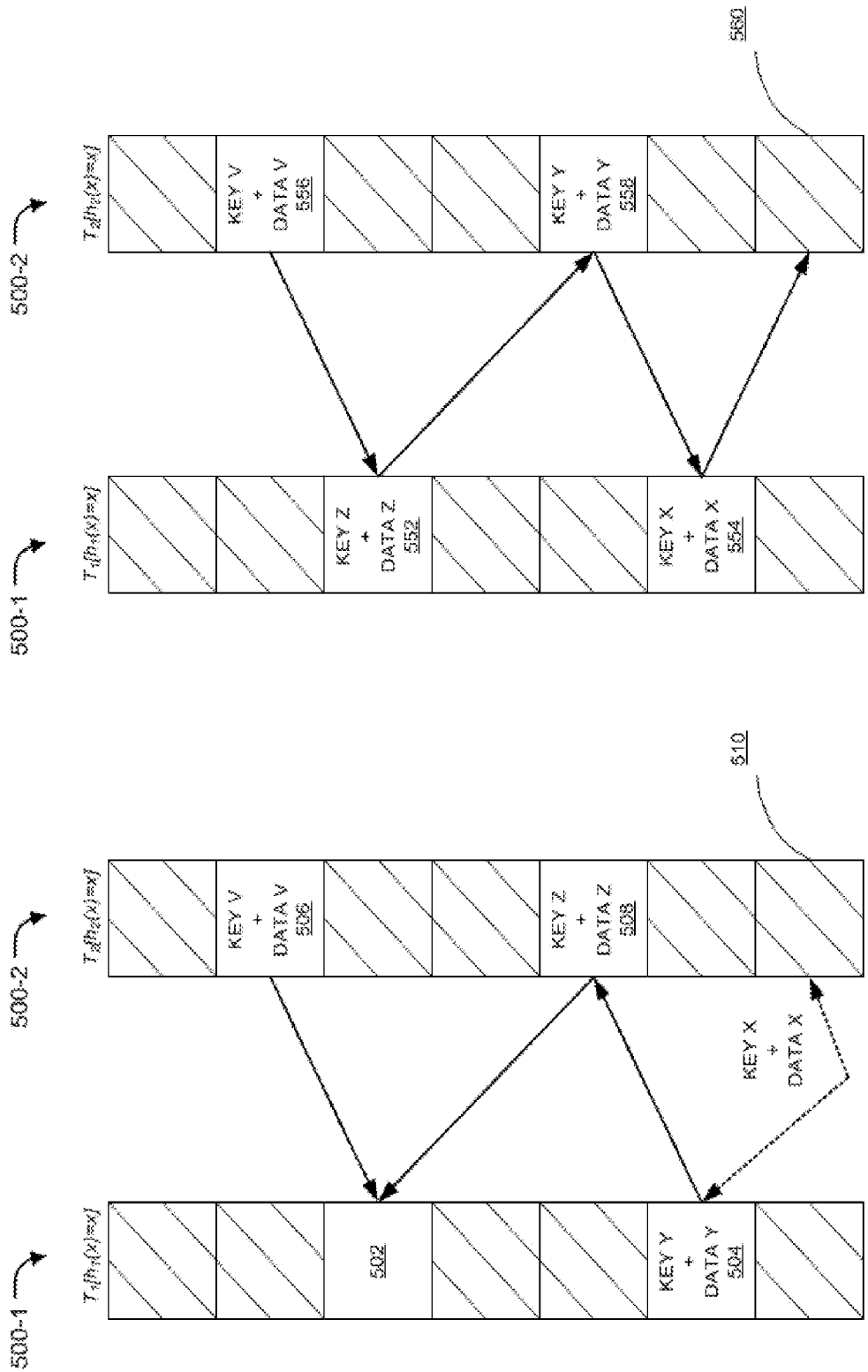

USING CUCKOO MOVEMENT FOR IMPROVED CACHE COHERENCY

BACKGROUND

Technical Field

Methods and example implementations described herein are generally directed to hardware hash tables, and more specifically, to a hash table applicable to CPU caches and cache coherence directories within a cache coherent system.

Related Art

In related art computer systems, instructions and data were stored and fetched from a main storage by a memory subsystem control for execution or use by a central processor unit, or possibly by some special function unit, such as a floating-point processor. In a few systems, some instructions and data may be retained after their use in a cache memory, which can be accessed more quickly than the main storage. As a result, such instructions and data can be reused later in the execution of the same program. This related art scheme improves the execution performance of the computer system by reducing the time taken to fetch the instructions and data for processing by the central processing unit.

In related art computer systems that have cache memories, the number of cycles required to retrieve an instruction or a data item depends on whether the data item is already in the cache or not, and on how many instructions are required to address or retrieve the data item. If the data item is not in the cache (e.g., a "cache miss"), the instruction or data item must be fetched from main memory, which consumes some number of instruction cycles. If the data item is in the cache, some instruction cycles will also be consumed, although the consumed instruction cycles will be fewer than in the case of a cache miss. Nevertheless, any improvement that can be made in the processing of cached data and instructions is useful. In certain circumstances, the improvement may make a considerable difference to the processing performance of the system.

FIG. 1(a) and FIG. 1(b) illustrate cache memory architectures 100 and 110 respectively, showing placement of cache memory in the hardware layout. As is illustrated, cache memory 104 is positioned between CPU 102 and main memory 106. Data block access from the cache 104 is much faster when compared with access of the same data block from the main memory 106. Similarly, FIG. 1(b) illustrates multiple caches 114, 116, and 118 configured between the CPU 112 and main memory 120.

Most related art caching techniques have a fundamental tradeoff between cache latency and hit rate, wherein larger caches have better hit rates but longer latency. To address this tradeoff, many computers use multiple levels of cache, with small fast caches backed up by larger, slower caches. Multi-level caches generally operate by checking the smallest level 1 (L1) cache 114 first. If a hit occurs in L1, the processor proceeds at high speed. If the smaller cache misses, the next larger cache 116 (L2) is checked, and so on to L3 caches such as 118, before external/main memory 120 is checked.

FIG. 2(a) illustrates structural layout of cache memory 200. As is illustrated, the cache memory 200 comprises multiple blocks, each having a length of K words. Each block line is also associated with a tag that identifies the block being stored. Tag is usually the upper portion of the memory address. As illustrated, the cache memory 200 comprises C blocks, which is much lesser than the number of blocks, say M, of the main memory. FIG. 2(b) illustrates architectural layout of interactions 250 between cache memory 254, processor 252, and system bus 260 through address buffer 256 and data buffer 258. As represented, processor 252 sends address level instructions to the cache to identify the location of data block that is to be fetched along with issuing data requests to the cache 254. Address information paths are provided between the CPU 252, cache 254, and address buffer 256, whereas data information paths are provided between CPU 252, cache 254, and data buffer 258. The cache 254, address buffer 256, and the data buffer 258 all interact with the system bus 260 to receive data blocks and interact with the main memory (not shown).

Typically, a cache is divided into a number of sets of lines, wherein each set comprises a fixed number of lines. A data block from main memory can be configured to map to any line in a given set determined by the respective block address. For instance, in case there are "m" number of lines in the cache, "v" number of sets, and "k" number of lines per set, the value of k would be k=m/v. In such a case, a main memory block number "j" can be placed in a set "i" based on the equation, i=j modulo v.

Improvements in cache memory performance have been sought using various methods of linking and associating groups of cache lines so as to form a policy that is configured to decide where in the cache a copy of a particular entry of main memory will go. If the policy is free to choose any entry in the cache to hold the copy, the cache is called "fully associative". At the other extreme, if each entry in main memory can go in just one place in the cache, the cache is "direct mapped". Many caches implement a compromise in which each entry in main memory can go to any one of N places in the cache, and are described as "N-way set associative". For instance, in a 2-way set associative, any particular location in main memory can be cached in either of 2 locations in a data cache. Similarly, in a 4-way set associative, any particular location in main memory can be cached in any of the four locations in a data cache. Multiple algorithms can be used for determining the location in which the data block can be stored.

Indexing in a cache design refers to a method of storing each address in a subset of the cache structure. A common related art mechanism involves using low-order address bits to determine the entry, or the set of entries, that a data block can be stored in. By restricting addresses to a very small set of entries, there is a possibility that the most useful data (usually the most recently used data) may all map to the same set of entries. Such a mapping would limit the effectiveness of the cache by utilizing only a subset of the entire structure. For indexed caches to work effectively, the addresses needed by a program at any particular time need to be spread across all of the sets of the cache. Addresses spread across the cache allow full use of the lines in the cache. Most programs naturally have a good distribution of addresses to sets, which is one reason caches work well in general.

A cache miss refers to a failed attempt to read or write a piece of data in the cache, which results in a main memory access with much longer latency. A cache write miss to a data cache generally causes the least delay, because the write can be queued and there are few limitations on the execution of subsequent instructions. The processor can continue until the queue is full.

Lowering the cache miss rate is a major area of focus. Therefore, a great deal of analysis has been done on cache behavior in an attempt to find the best combination of size, associativity, block size, and so on. There can be multiple kinds of cache misses, which can impact the cache and processing performance in different ways. For instance, compulsory misses are those misses that are caused by the first reference to a location in memory. Cache size and associativity make no difference to the number of compulsory misses but prefetching data can help here, as can larger cache block sizes. Capacity misses are those misses that occur regardless of associativity or block size of the cache memory, solely due to the finite size of the cache. Conflict misses, on the other hand, are misses that could have been avoided had the cache not evicted an entry earlier. Conflict misses can be further broken down into mapping misses, that are unavoidable given a particular amount of associativity, and replacement misses, which are due to the particular victim choice of the policy (e.g., such as a replacement policy).

While the natural address distribution in programs is generally acceptable, cache performance is often limited by inadequate distribution. Some critical code sequences may concentrate activity in a particular set, which results in new lines replacing other lines that are still useful. If the program tries to access the replaced lines, the program will result in a cache miss and performance will be reduced while the processor waits for the cache to be refilled. As explained above, these caches misses are referred to as conflict misses. The cache itself may be large enough to store all of the useful lines, but the limitations due to indexing force useful lines out of the cache even though there are less useful lines elsewhere in the cache.

There are a few methods of reducing the problem of conflict misses. One way is to allow each address to go to multiple locations (set-associative). This method allows hardware to choose among several possible lines in the cache to evict. Performance can be improved by carefully selecting which line to replace, making sure the least useful address is replaced. A different approach to reducing conflict misses is to improve upon the natural distribution of addresses across sets. Using low-order bits provides a good distribution, but some patterns may exist that lead to less distribution and more conflicts. These patterns can happen because programs are written by people and compiled in a non-random manner.

To improve distribution, an index hash can be used. Hashing involves manipulating the address in such a way that any natural pattern is less likely. Hashing can be implemented by means of a hash table that uses a hash function to compute an index into an array of buckets or slots, from which the correct value can be found. As the hash functions typically introduce randomness in the placement of the data blocks based on indexes calculated such as by XOR-ing high-order bits with low-order bits, usage of hash tables is one way to "randomize" the placement of data blocks, which can lead to a more even distribution.

To make room to store additional blocks (e.g., data or instructions copied from the storage device or the memory device), each cache may have a replacement policy that enables the cache to determine when to evict (e.g., remove) particular blocks from the cache. Multiple replacement policies exist for deciding which position to load the new data block to. A random replacement policy, for instance, places the new data block in any set/block of the cache memory, but increases the probability of the miss rate, as high priority data blocks may be made to leave the cache in such a process. Other policies can include first in, first out (FIFO), which makes the oldest block exit from the cache. Least recently used (LRU) is yet another technique used for block replacement.

Shared-memory multiprocessors have been applied quite considerably in high performance computing. They continue to become more relevant in the age of large multicore systems on chip (SoC). Address space is typically shared among multiprocessors so that they can communicate with each other through that single address space. When data is shared by multiple agents, a cache line can be present in more than one cache. When multiple copies exist, coherency may become an issue. Data should be consistent across all caches. The same cache block in multiple caches would result in a system with caches because of sharing of data. This problem does not affect the read process. However, for writes when one processor writes to one location, this change has to be updated to all caches. Most cache coherency protocols have a shared state in which data can be shared between any number of system components (e.g., processors). The shared (S) state arises when a system component requests a read-only copy of the data and the data was already in an Exclusive (E) state in another system component.

The requesting system component and the system component that had a copy of the data each mark the data in shared state. When data is in the shared state, that data can be freely copied by the system components requesting a read-only copy of the data. In a system, cache coherency protocols can either permit a system component to provide the shared data to a requesting system component or the data can be retrieved from the higher memory level directly.

In directory-based cache coherency system, the cache line addresses being shared by agents in the system are tracked in a directory that maintains the coherence information between agent caches. The directory acts as a filter through which the processor must ask permission to load a cache line from the primary memory to its cache. When a cache line is modified, the directory either updates or invalidates the other caches with that entry. A cache coherence protocol uses data structures and messaging to track and co-ordinate the locations of all cached copies of every block of shared data. These cache coherency maintenance data structures can be centralized or distributed and are called directories. For each block of data there is a directory entry that contains a number of pointers. The purpose of the pointers is to mention the system agent where block copies are located and, as a result, keep track of the cached copies of the data block.

When the number of sharer agents in the system is large, maintaining a bit vector for the sharers is more efficient than binary pointers for each sharing agent. Each directory entry also contains a write-permission bit to specify whether a unique cache has a permission or not to write the associated block of data. In implementation, a cache miss results in communication between the node where the cache miss occurs and the directory so that the information in the affected caches is updated. A coherency protocol is a set of mechanisms to maintain coherence between the caches in the system. It defines the states of the cache lines in the system, conditions and transition between the states and operations and communications performed during coherent read and write requests. MSI is an example of a coherence protocol employed to maintain coherence in a multi-processor system. The letters M (modified), S (shared) and I (Invalid) in the protocol name identify the possible states in which a cache line can be as specified by the protocol.

Each directory entry typically contains a tag corresponding to the address of a given memory block, identifying information for locating all processors that are caching the block, and a status field indicating whether the cached copies are valid. The directory information of a node is used to evaluate read and write requests pertaining to the memory blocks of the node, and to send out coherency messages to all caches that maintain copies. When a processor in the system updates a shared memory block, the directory having jurisdiction over the memory block is consulted to determine which caches hold copies of the block. Before the write operation can proceed, invalidation messages are sent to the identified caches and invalidation acknowledgements must be returned to verify that all cached copies have been invalidated. In similar fashion, when a processor requests read access to a shared memory block, the directory having jurisdiction over the block is consulted to identify the location and status of all cached copies. Based on the information in the directory, the requested block can be provided to the requestor from one of the caches holding a valid copy, or from the main memory of the node that stores the block.

An efficient data structure is typically needed to implement directory tables where coherent cache lines addresses, their sharers, and states are tracked. Architecture of such a directory table should have an implication on the total amount of memory needed for tracking all coherent cache line addresses in the system, utilization of this memory, and performance of the system.

Snooping is a process where the individual caches, monitor address lines for access to memory locations that they have cached instead of a centralized directory-like structure handling the monitoring. When a write operation is observed to a location that a cache has a copy of, the cache controller invalidates its own copy of the snooped memory location. In the snooping solution, a snoopy bus is incorporated to send all requests for data to all processors, wherein the processors snoop to see if they have a copy and respond accordingly. This mechanism therefore involves a broadcast, since caching information is stored in the processors. A multiple snoop filter reduces the snooping traffic by maintaining a plurality of entries, each representing a cache line that may be owned by one or more nodes. When replacement of one of the entries is required, the snoop filter selects for replacement the entry representing the cache line or lines owned by the fewest nodes, as determined from a presence vector in each of the entries. A temporal or other type of algorithm is used to refine the selection if more than one cache line is owned by the fewest number of nodes.

A class of dictionary data structures called Hash tables are associative structures used to store and access [Key, Value] pairs. The defining characteristic of hash table lookup is that for a majority of access requests, a key's value is located in a linear table at an address that is determined directly by applying a function, i.e., the hash function, to the key. Because the location for storing the value is known from the key (except in those cases where there is a hash function collision), a hash table lookup can be performed on average in constant time. Hashing mechanisms play an important role in many computer systems.

One such example of a related art hashing mechanism 300 is depicted in FIG. 3. The hashing mechanism 300 comprises a key 302, a hash function 304, a hash index 306, and a hash table 308. The hash table 308 contains a number of hash buckets 310-330, and each hash bucket contains data, such as a record, with one of the fields of the record acting as the key 302. To access the hash table 308, the key 302 is input into a hash function 304, which yields an index 306 (or hash address) that refers to a specific hash bucket (e.g., 314). Within the hash bucket 314 is the data that matches the key.

Hash tables are useful because they provide direct access to data by mapping a large range of key values into a smaller range of indexes. In this manner, for example, if a key of eight digits were utilized having a range of key values from 0 to 99,999,999 and if less than ten values are ever used, a hashing mechanism can be used to hash the key into an index of one digit to refer to a hash table containing ten buckets. Therefore, instead of using a hash table having one-hundred-million hash buckets where only a very limited number of the buckets are ever used, a hash table of only ten buckets can be used to more efficiently use system resources, but still provide direct access to the data. The function "h" 304 maps each key value onto exactly one index, and therefore, whenever the same key value is used more than once, the same index 306 into the hash table 308 is generated. Sometimes, however, when attempting to store data in the hash table 308, more than one key value will hash to the same index 306. In this situation, a "collision" has occurred.

When a collision occurs, the data must be stored in the hash bucket indicated by the index and therefore more than one record will be stored in this hash bucket. Hash bucket 318 depicts the state of a hash bucket after a collision has occurred and more than one record is stored in the hash bucket. In hash bucket 318, one record of data "Data 3" is linked to a second record of data "Data 4." As more collisions occur, the hash buckets become more populated and thus the benefits of a hash table start to diminish because each record within the hash bucket is no longer directly accessible. Instead, after hashing the key value into an index, the index refers to a hash bucket that contains a number of records linked together and the hash bucket must then be searched to determine the correct record, which is costly in terms of processing time. Therefore, related art hashing systems are designed to avoid collisions.

Any hash set algorithm must deal with collisions. Collisions are when two distinct items hash to the same table entry. Open addressing algorithms typically resolve collisions by applying alternative hash functions to test alternative table elements. Closed addressing algorithms place colliding items in the same bucket, until that bucket becomes too full. In both types of algorithms, it is sometimes necessary to resize the table. In open addressing algorithms, the table may become too full to find alternative table entries, and in closed addressing algorithms, buckets may become too large to search efficiently. Open addressing schemes have the potential performance advantage of involving one level less of indirection in accessing an item in the table, since the item is placed directly in an array, not in a linked list implementing a bucket.

One important statistic for a hash table is called the load factor, which is simply the number of entries divided by the number of buckets, that is, $\alpha=n/k$, where $\alpha$ is the load factor, n is the number of entries, and k is the number of buckets. If the load factor $\alpha$ is kept reasonable, the hash table should perform well, provided the hashing is good. If the load factor $\alpha$ grows too large, the hash table will become slow, or it may fail to work (depending on the method used). For a fixed number of buckets, the time for a lookup grows with the number of entries and so does not achieve the desired constant time. If the set implementation used for the buckets has linear performance, then $O(1+\alpha)$ time may be required to do add, remove, and member. To make hash tables work well, it is necessary to ensure that the load factor $\alpha$ does not exceed some constant $\alpha_{max}$, so all operations are $O(1)$ on average.

Cuckoo hashing is a related art multiple-choice hashing scheme that gives better space utilization by moving elements around as needed. This technique was originally presented by Pagh and Rodler in Cuckoo Hashing, *Proceedings of the 9th European Symposium on Algorithms* (2001).

Cuckoo hashing employs two hash functions and two respective hash tables ($T_1$ and $T_2$), which may be considered to be two portions or subtables of a single cuckoo hash table. Each entry is stored in a bucket of $T_1$ or a bucket of $T_2$, but never in both.

FIG. 4 is a diagram of cuckoo hash tables arranged according to related art principles. Here, the table $T_1$ is identified by reference number 400 and the table $T_2$ is identified by reference number 450. As explained, a given key will be hashed by the first hash function to determine its bucket in table $T_1$ and that same key will be hashed by the second hash function to determine its bucket in table $T_2$. In other words, using the same nomenclature, $T_1[h_1(x)]=x$ and $T_2[h_2(x)]=x$, where $h_1$ is the first hash function, $h_2$ is the second hash function, and x is the key.

In practice, therefore, a given key is hashed using the two different hash functions to obtain two possible cuckoo hash table locations or buckets (alternatively, a single hash function with multiple results can be used). Then, those buckets can be searched for the key. If the key is found in one of the two buckets, then data stored with that key can be accessed, retrieved, processed, etc. As an example, FIG. 4 illustrates that Key A can be potentially stored in its respective bucket 402 in table 400 or in its respective bucket 458 in table 450. The arrow between bucket 402 and bucket 458 indicates potential movement or pushing of Key A between bucket 402 and bucket 458. As depicted in FIG. 4, Key B has its potential locations in table 400 and table 450, Key C has its potential locations in table 400 and table 450, and Key D has its potential locations in table 400 and table 450. In practice, table 400 and/or table 450 can include a number of empty buckets such as 406 to accommodate the insertion of new keys (and corresponding data) and to accommodate pushing of existing keys between table 400 and table 450.

A hash function may generate the same hash value (i.e., a locator or identifier for a given bucket) for two or more different input values. In other words, given a first key $x_1$ and a second key $x_2$, $h_1(x_1)$ might equal $h_1(x_2)$. In a cuckoo hash table, collisions are handled by moving entries from one table to another. With this in mind, FIG. 5(a) and FIG. 5(b) are diagrams (used for purposes of this simplified example) that illustrate pushing of keys in cuckoo hash tables. FIG. 5(a) depicts the status of the first table 500-1 and the second table 500-2 at a time when an entry (Entry X, which includes Key X and corresponding data) is to be inserted. The shaded areas represent occupied or unavailable buckets in the table. As explained above, the two hash functions indicate that Entry X can be inserted into the bucket 504 of table 500-1 or into the bucket 510 of table 500-2 (but not both). This example represents an attempt to initially insert Entry X into bucket 504. The arrows in FIG. 5(a) and FIG. 5(b) indicate the manner in which the given entry can be pushed from table 500-1 to table 500-2, or vice versa. Thus, referring to FIG. 5(a), although Entry Y is contained in bucket 504, it may alternatively be contained in the bucket 508 of table 500-2. Similarly, although Entry Z is presently contained in bucket 508, it may be pushed into the bucket 502 of table 500-1. It is to be noted that bucket 508 may contain either Entry Y or Entry Z, meaning that the hash function $h_2(x)$ will generate the same value (corresponding to bucket 508) using either Entry Y or Entry Z as an input value. Moreover, Entry V can be moved from its current location (the bucket 506 of table 500-2) to its alternative location, namely, bucket 502 of table 500-1.

FIG. 5(b) depicts the status of the first table 500-1 and the second table 500-2 after insertion of Entry X and pushing of Entry Y and Entry Z. As shown, Entry X is now contained in bucket 554. Entry X displaced Entry Y, which has been pushed to bucket 558. In turn, Entry Y displaced Entry Z, which has been pushed to bucket 552. The insertion of Entry X was possible because bucket 552 of table 500-1 was empty prior to the insertion operation (see FIG. 5(a)). If the cuckoo hash tables are appropriately sized and managed, then enough empty buckets can be maintained to ensure that insertion and other operations do not fail.

In implementations involving a cuckoo directory, having multiple cuckoo ways allows addresses greater probability of finding an unused entry. The directory always has the possibility of empty spots, whereas a cache is just filled. The directory can be sized as needed.

As described above, conflicting entries may occur in a cuckoo directory. For example, suppose one address A wants to hit two different entries in the directory that are both full B and C. An address has to be selected. In related art implementations, algorithms such as least recently used (LRU) can be employed to select an address. One of the entries needs to be evicted, and thus one of the directory entries from B and C are evicted, and replaced by A. When this eviction occurs, the cache must send an invalidation instruction or flush to coherent system instruction to write back dirty data and write back copies as the address is being evicted. However, this situation should be avoided because performance may degrade from the invalidation or flush instruction.

SUMMARY

The present application is directed to addition, search, and performance of other allied activities relating to keys in a hardware hash table. The present application is further directed to high performance and efficient design of hash table applicable to coherent caches (e.g., CPU caches) and cache coherence directories. Aspects of the present invention include combining set-associative tables and cuckoo hashing for construction of a directory table of a directory based cache coherence controller.

Aspects of the present disclosure may include a method for managing a coherency directory for a cache coherent system, wherein the coherency directory can include a plurality of entries arranged in a cuckoo hash. In an aspect, the method can include a step of receiving a first entry to be placed in a coherency directory and placing the first entry into the directory by replacing, say a second entry. The method can further include the step of moving the replaced second entry to an eviction buffer, and performing a lookup for replacing the second entry with a potential third entry is that different from the first entry. The method can further include the step of identifying the potential third entry based on one or more defined conditions and replacing the third entry by the second entry, wherein, upon replacement, the third entry can be moved into the eviction buffer.

Aspects of the present disclosure may further include a cache coherency controller having a coherency control logic capable of retrieving cache line state from a cache coherency directory. In an example implementation, coherency control logic can be configured to implement the cache coherent system of the present disclosure, wherein the logic manages the coherency directory for the proposed cache coherent system, and wherein the coherency directory comprises a plurality of entries arranged in a cuckoo hash. In the implementation, for each new entry, the controller can be configured to, replace the entry in the coherency directory at one of the plurality of entries in the coherency directory. In an example implementation, the new entry, say a first entry, can be placed in the directory so as to replace a second entry, and move the second entry into an eviction buffer, wherein the second entry can be attempted for reinsertion at a different position within the coherency directory. In another aspect, the coherency directory can be larger than a total cache capacity of the cache coherent system of the present disclosure. Controller of the present disclosure can further be configured to attempt reinsertion of the second entry into, say a third say, by performing a lookup on the replaced one of the plurality of entries in the directory, wherein if, during the lookup, a response is received from third entry that is not the first entry; the second entry can be replace the third entry and the third entry can be moved to the eviction buffer.

BRIEF DESCRIPTION OF THE DRAWINGS

FIG. 5(a) and FIG. 5(b) illustrate pushing of keys in cuckoo hash tables.

DETAILED DESCRIPTION

Figure 1A:
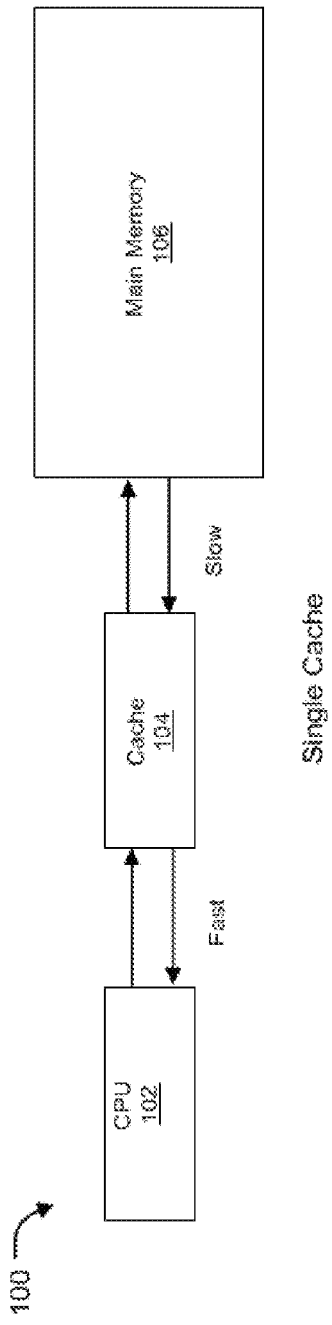
FIG. 1(a) and FIG. 1(b) illustrate example cache memory architectures respectively showing placement of cache memory in the hardware layout.
Figure 1B:
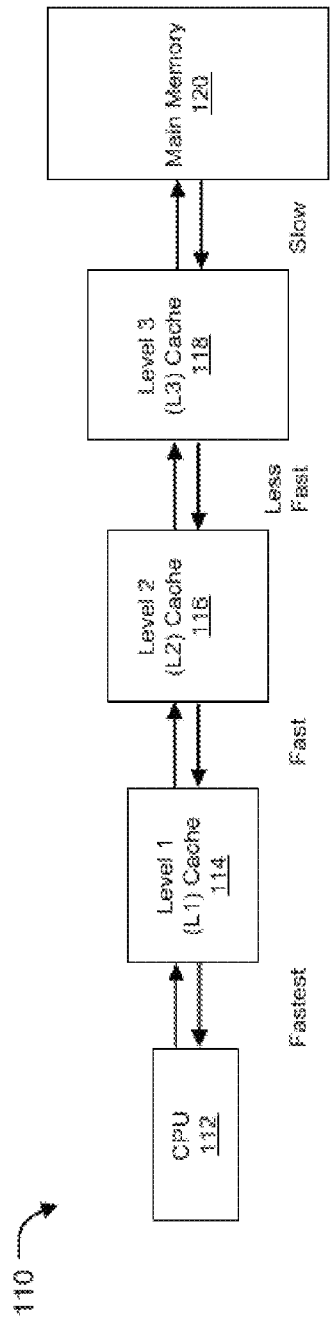
Figure 2A:
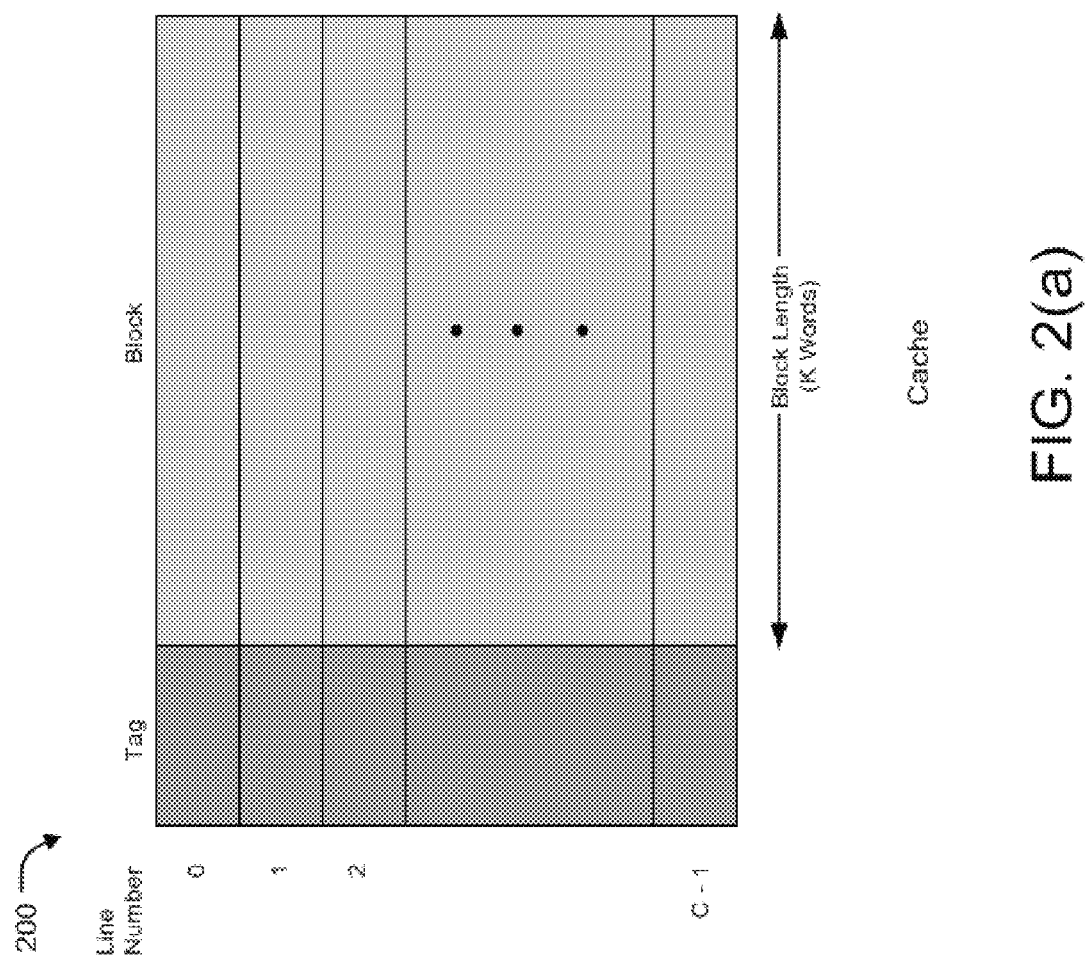
FIG. 2(a) illustrates structural layout of cache memory.
Figure 2B:
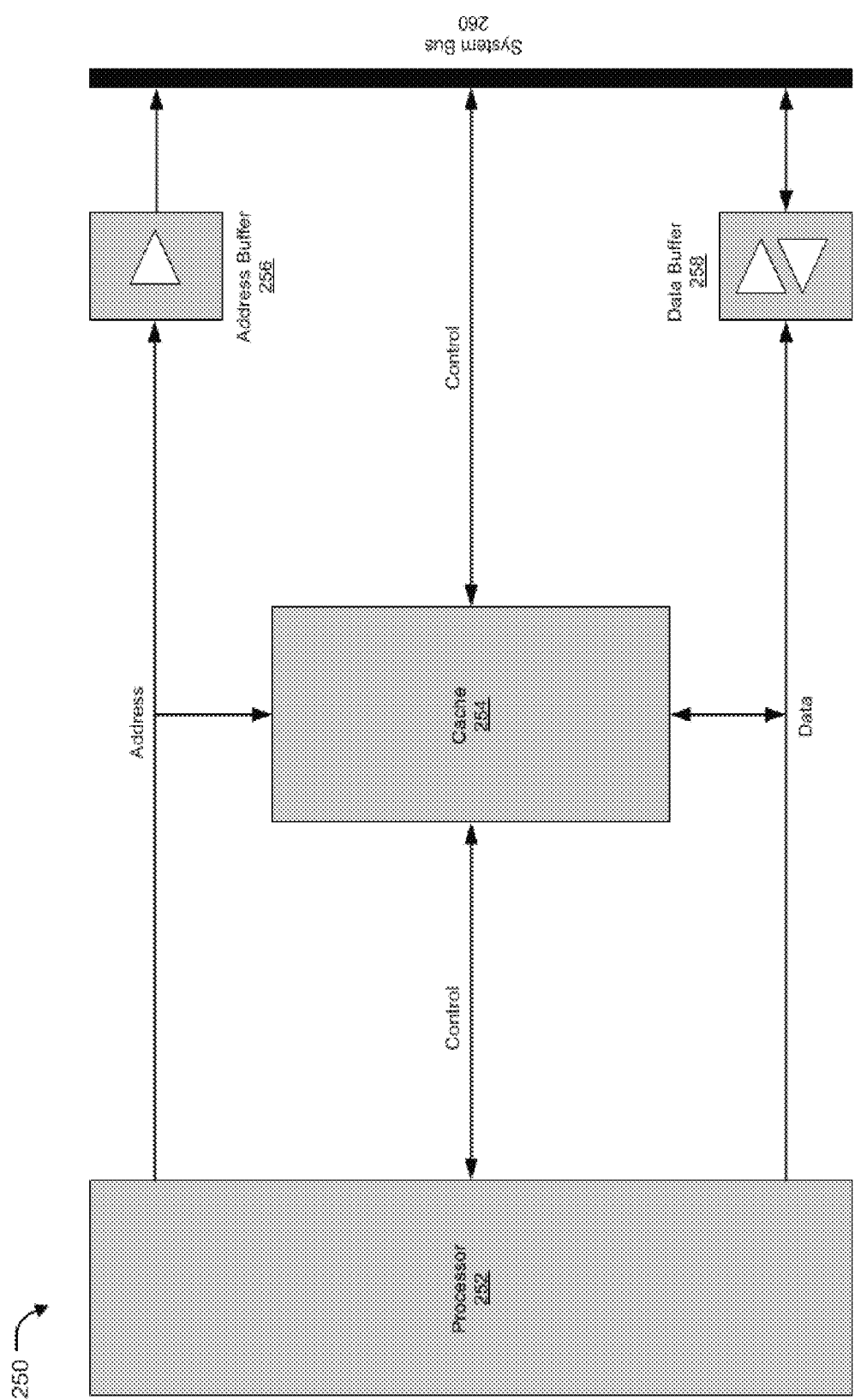
FIG. 2(b) illustrates interactions between processor and cache through address and data lines.
Figure 3:
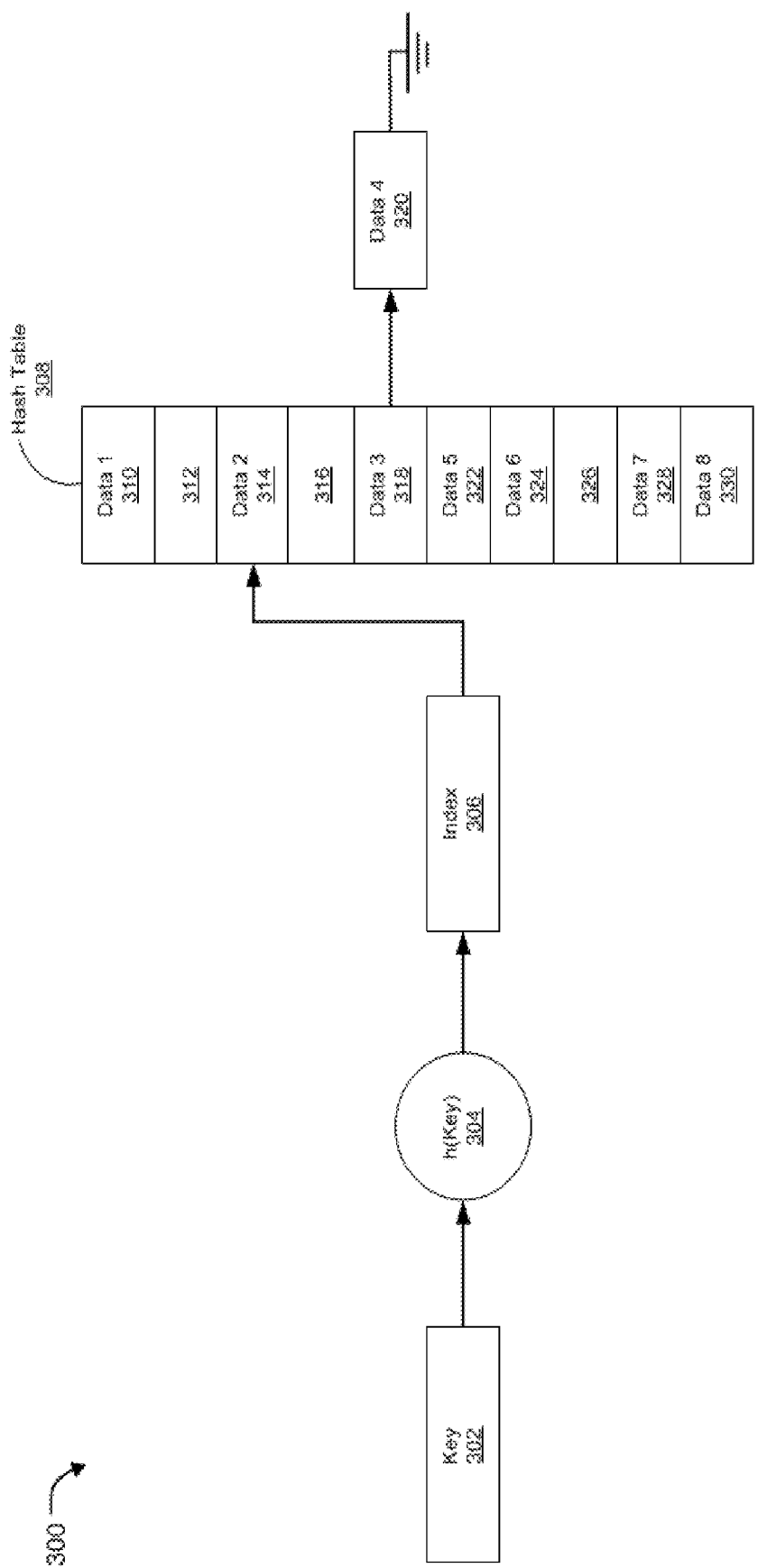
FIG. 3 illustrates an exemplary hashing mechanism.
Figure 4:
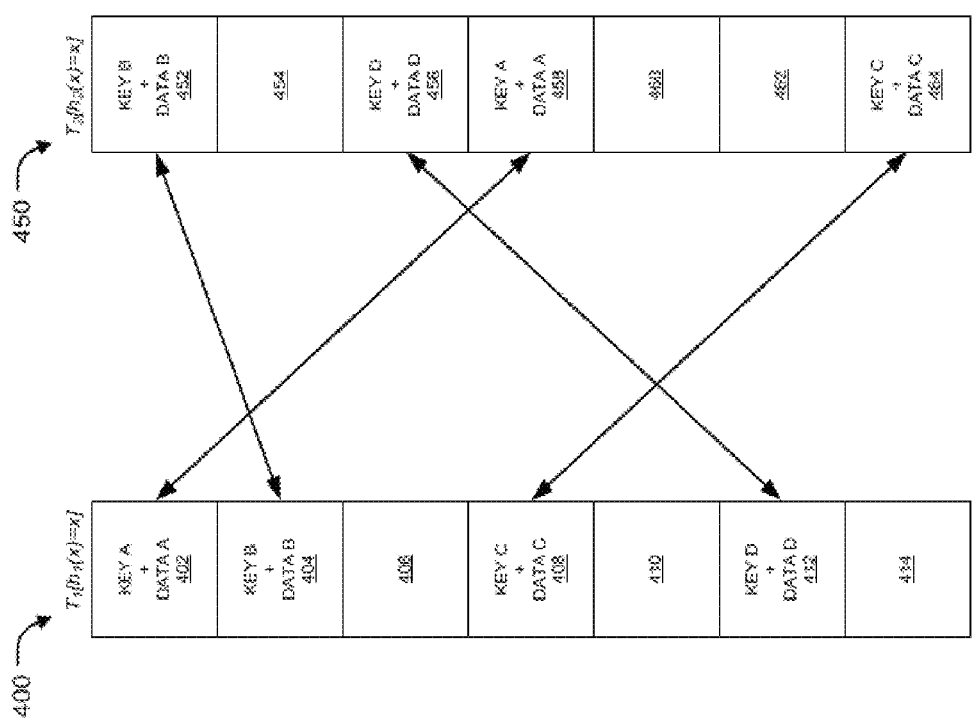
FIG. 4 illustrates example cuckoo hash tables and mapping of keys between hash tables.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application.

The proposed subject matter discloses a hardware hash table that can implement a combination of associativity and cuckoo hashing. The disclosed hash table can be applied to but is not limited to CPU caches, directories for cache coherence, among other like structures. An example implementation of the disclosure as it applies to a directory based coherence controller will also be described, without in any way restricting the general applicability of the presented disclosure.

Example implementations of the present disclosure are directed to handling eviction of a conflicting cuckoo entry while reducing performance degradation resulting from related art implementations. In an example implementation, when an address is replacing another address, the addresses share at least one mapped location. However, the other mapped locations are usually not shared. Therefore, if another lookup can be conducted with the new address, the evicted address may find another empty space in the directory and fill that empty space.

Figure 6C:
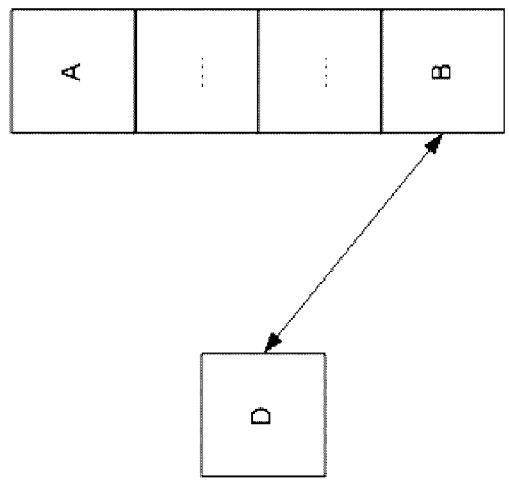
FIGS. 6(a) to 6(c) illustrate example of an eviction and attempted reinsertion, in accordance with an example implementation.
Figure 6B:
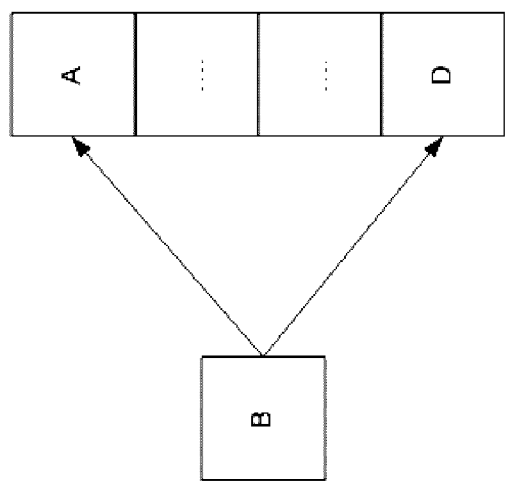
Figure 6A:
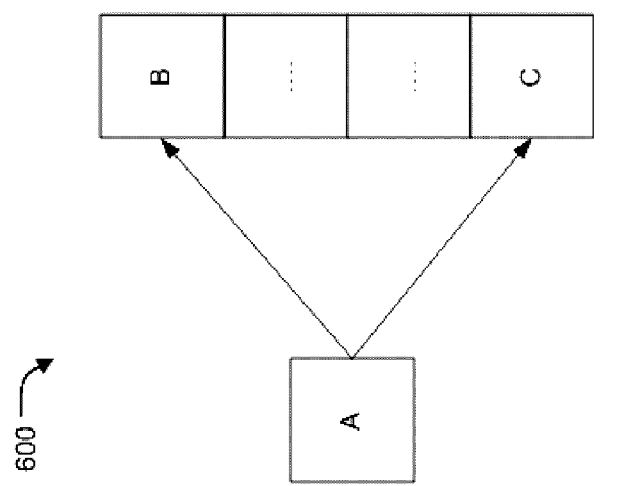

FIGS. 6(a) to 6(c) illustrate example of an eviction and attempted reinsertion, in accordance with an example implementation. Specifically, FIGS. 6(a) to 6(c) illustrate use of multi-way associativity of the cuckoo hashing in accordance with an example implementation. In FIG. 6(a), suppose an address A can map to two entries, say B and C, both of which are full in the directory, an address (one of B or C) has to be selected, and one of the entries (B or C) is thereby evicted. In FIG. 6(b), suppose entry B is evicted and replaced by address A, the entry B would be sent to the eviction buffer. In FIG. 6(c), when a lookup is performed on entry B, entry B will refer back to its original location (now occupied by address A) but will also refer to another space D in the directory. If space D is empty, then entry B can occupy that location. However, if space D is not empty, then additional operations can be performed, such as evicting entry D and replacing it with entry B while placing entry D in the buffer. This process can be repeated until the eviction buffer is emptied, and empty spaces are found for all entries in the eviction buffer. The procedures for when to perform a lookup or how to resolve the eviction buffer are described, in a non-limiting manner, with respect to the example implementations below.

Eviction Buffer and Reinsertion

In an example implementation, for a new entry for the coherency directory causing a replacement to one of the entries in the coherency directory, the replaced entry can be placed into an eviction buffer; and a reinsertion can be attempted into a different position within the coherency directory. The implementation of the reinsertion can be done in several ways by the controller of the cache coherent system.

In one example implementation, the reinsertion can be done opportunistically, wherein a lookup can be performed on the evicted entry, and ways of the evicted entry can be analyzed. The way associated with the inserted entry can be ignored as that way was used to evict the current entry. The lookup can be performed on a spare cycle of the cache coherent system, or can be forced using any algorithm (e.g., too long of a wait, queue is full, etc.) based on the desired implementation.

Flush Command

In an implementation, there is the possibility that a snoop operation may be sent to the agent associated with the cache during the process as outlined in FIGS. 6(a) to 6(c). In such a situation, it may be undesirable to send to an agent (e.g., sending a replacement for B) that is in the middle of processing. This is the case where a coherent action is already outstanding for the replacement address, and the hardware should wait for the coherent action to complete before issuing a directory-caused flush. By sending the coherent action to the coherency unit, the process can be serialized, which is a function coherency units do for requests to the same address.

In such a situation, an eviction is first performed, and a flush command is issued through the coherency unit of the cache coherent system as an internal command but looks like a clean invalid or cache maintenance operation. Directory lookup is based on coherency pipeline timing.

Fake Cache Maintenance Operation

In an example implementation a "fake" cache maintenance operation can be invoked. When a cache maintenance operation is invoked, the operation has a side effect of a doing a lookup for the evicted address in the directory, which can be used to find an empty spot as illustrated in FIGS. 6(a) to 6(c). If an empty spot is found for the evicted address, the cache maintenance operation can then be canceled and the evicted address can be replaced. If an empty spot is not found, the maintenance operation can be completed and the line can be forced to be flushed. The resulting behavior of the cache maintenance operation is the execution of a free lookup operation without sending a snoop if it becomes unnecessary. By issuing the modified cache maintenance operation an automatic lookup is thereby invoked and various protocols can be satisfied.

Iteration

As illustrated in FIGS. 6(a) to 6(c), when a lookup is performed on A; B and C are returned. Thus, when a lookup is performed on the evicted B, as shown in FIG. 6(b), the result is the replaced location A and another location D. Based on the implementations above, D is then evicted and placed in the eviction buffer, wherein B can then replace the location previously occupied by D as illustrated in FIG. 6(c).

The process can then be iterated with a lookup conducted against D, which will result in the location of B and another location. The same eviction and replacement process can be iterated until an empty location is found, or until a number of iterations has been reached. The number of iterations can also be set/defined based on a desired implementation. For example, the number of tries can be a static count, or can be derived based on how full the eviction buffer gets (e.g., if 60% full, then start evicting with snoops, if not full, then no snoops are needed). Number of tries can therefore be proportional to the costs of the system. In an example implementation, the eviction buffer tracks the number of reinsertions, and as it counts up, it increments a counter and when it finishes, it will issue a snoop to evict an address.

Figure 7:
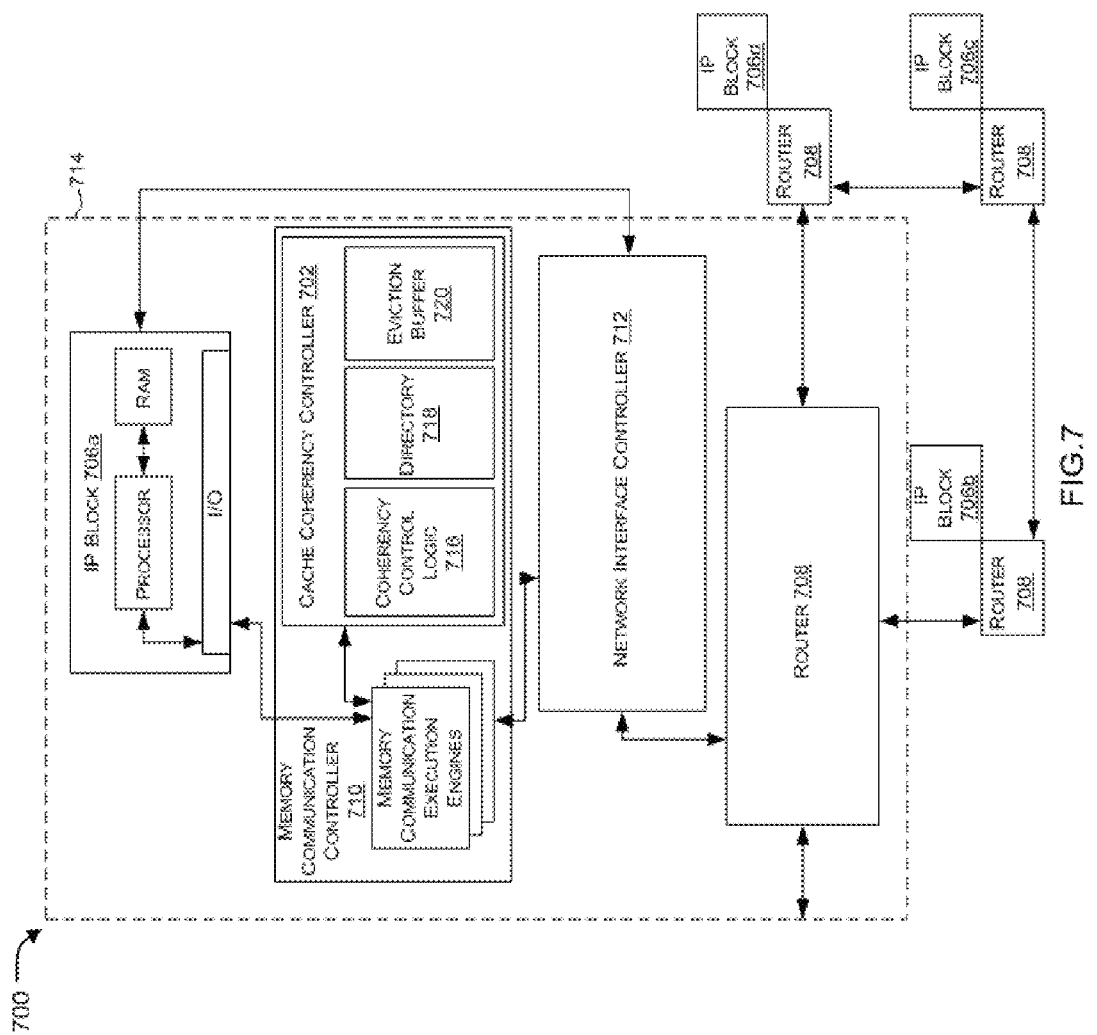
FIG. 7 illustrates an exemplary architecture block diagram of a NoC showing a cache coherency controller in accordance with an example implementation of the present disclosure.

FIG. 7 illustrates an exemplary architecture block diagram of a NoC 700 showing a cache coherency controller 702 in accordance with an example implementation of the present disclosure. As shown, controller 702 of the present disclosure is configured to execute a memory access instruction, and configured to determine a state of a cache line addressed by the memory access instruction, the state of the cache line being one of shared, exclusive, or invalid. Such a memory communications controller is also configured to broadcast an invalidate command to a plurality of IP blocks of the NOC if the state of the cache line is shared and transmit an invalidate command only to an IP block that controls a cache where the cache line is stored if the state of the cache line is exclusive.

In one aspect, NoC 700 of the present disclosure comprises a plurality of integrated processor ('IP') blocks such as 706a, 706b, and 706c, collectively referred to as IP blocks 706 hereinafter, one or more routers 708, one or more memory communications controllers 710, and one or more network interface controllers 712. In an example implementation, each IP block 706 can be adapted to a router 708 through a memory communications controller 710 and a network interface controller 712. Each memory communications controller 710 controls communications between an IP block 706 and memory, and each network interface controller 712 controls inter-IP block communications through routers 708. In the example of FIG. 7, one set 714 of an IP block 706a adapted to a router 708 through a memory communications controller 710 and network interface controller 712 is expanded to aid a more detailed explanation of their structure and operations. All the IP blocks, memory communications controllers, network interface controllers, and routers in the example of FIG. 7 can be configured in the same manner as the expanded set 714.

In the example of FIG. 7, memory communications controller 710 of the set 714 can include a cache coherency controller 702 with coherency control logic 716 capable of retrieving cache line state from a cache coherency directory 718. In an example implementation, coherency control logic 716 can be configured to implement the cache coherent system of the present disclosure, wherein the logic 716 manages a coherency directory such as, but not limited to, directory 718 for the proposed cache coherent system, wherein the coherency directory 718 comprises a plurality of entries arranged in a cuckoo hash. In the implementation, for each new entry, the logic 716 can be configured to, replace the entry in the coherency directory at one of the plurality of entries in the coherency directory 718. In an example implementation, the new entry, say a first entry, can be placed in the directory 718 so as to replace a second entry and move the second entry into an eviction buffer 718, wherein the second entry can be attempted for reinsertion at a different position within the coherency directory 718.

In another aspect, the coherency directory 718 can be larger than a total cache capacity of the cache coherent system of the present disclosure. Controller 702 of the present disclosure can further be configured to attempt reinsertion of the second entry into, say a third say, by performing a lookup on the replaced one of the plurality of entries in the directory 718, wherein if, during the lookup, a response is received from third entry that is not the first entry; the second entry can be replace the third entry and the third entry can be moved to the buffer 720. In an implementation, the controller can be configured to perform the lookup by conducting the lookup once during a spare cycle during management of the cache coherent system. In another aspect, the controller 702 can be configured to perform the lookup based on an algorithm.

In yet another aspect, the controller 702 can be configured to attempt reinsertion of the second entry by invoking a cache maintenance operation to the coherency directory 718, wherein in case an empty location is found in the directory 718, the second entry can be moved to the found location and the cache maintenance operation can be cancelled, whereas in case the cache maintenance operation does not find an empty location in the coherency directory 718 for the second entry (replaced one of the plurality of entries), a new entry such as a third entry can be removed from the directory 718 through a snoop operation that is triggered by the cache maintenance operation.

In another aspect of the present disclosure, the controller 702 can be configured to perform lookup for an entry (such as second entry mentioned above) in the eviction buffer 720 for a defined number of times, denoted by say a threshold, until an empty entry is found or the eviction buffer 720 is empty. In case an empty entry is found, the second entry can be placed from the eviction buffer into the empty entry, whereas, in case the empty entry is not found, and the number of times for lookup has exceeded the defined threshold, a third entry in the directory 718 can be replaced by the second entry and the third entry can be positioned in the eviction buffer. In case the eviction buffer 720 is not empty and the number of times has exceeded or is equal to the defined threshold/limit, a snoop operation can be triggered on entries in the eviction buffer 720. In an implementation, the defined threshold is a fixed limit, whereas, in another implementation, the defined limit is set proportionally to a capacity of the eviction buffer 720.

In yet another example implementation, the controller 702 can be configured to attempt reinsertion of the second entry by replacing with a third entry by performing a single lookup on the second entry (replaced one of the plurality of entries), wherein in case the lookup results in a identification of an empty location, the second entry can be placed into the identified empty location.

Figure 8:
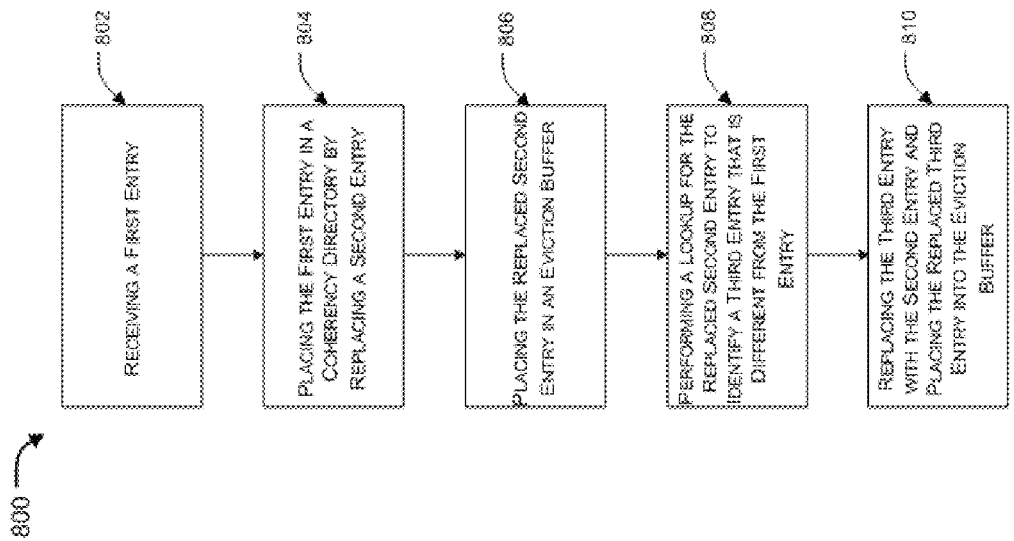
FIG. 8 illustrates a flow diagram in accordance with an example implementation of the present disclosure.

FIG. 8 illustrates a flow diagram 800 in accordance with an example implementation of the present disclosure. At 802, a first entry to be placed in a coherency directory is received, which, at 804, is placed into the coherency directory by replacing, say a second entry. At 806, the replaced second entry is moved to an eviction buffer, where, at 808, a lookup is performed for replacing the second entry with a potential third entry is that different from the first entry. At 810, in case a third entry is identified, the same can be replaced by the second entry, and the third entry can be moved into the eviction buffer. Depending on the desired implementation, a snoop can be issued to the entry in the eviction buffer at any time instead of replacing another entry with the entry in the eviction buffer. For example, the second entry can be snooped instead of being used to replace the third entry, or the flow of FIG. 8 can be iterated and the snoop issued after a certain number of iterations (e.g., predetermined, etc.).

Figure 9:
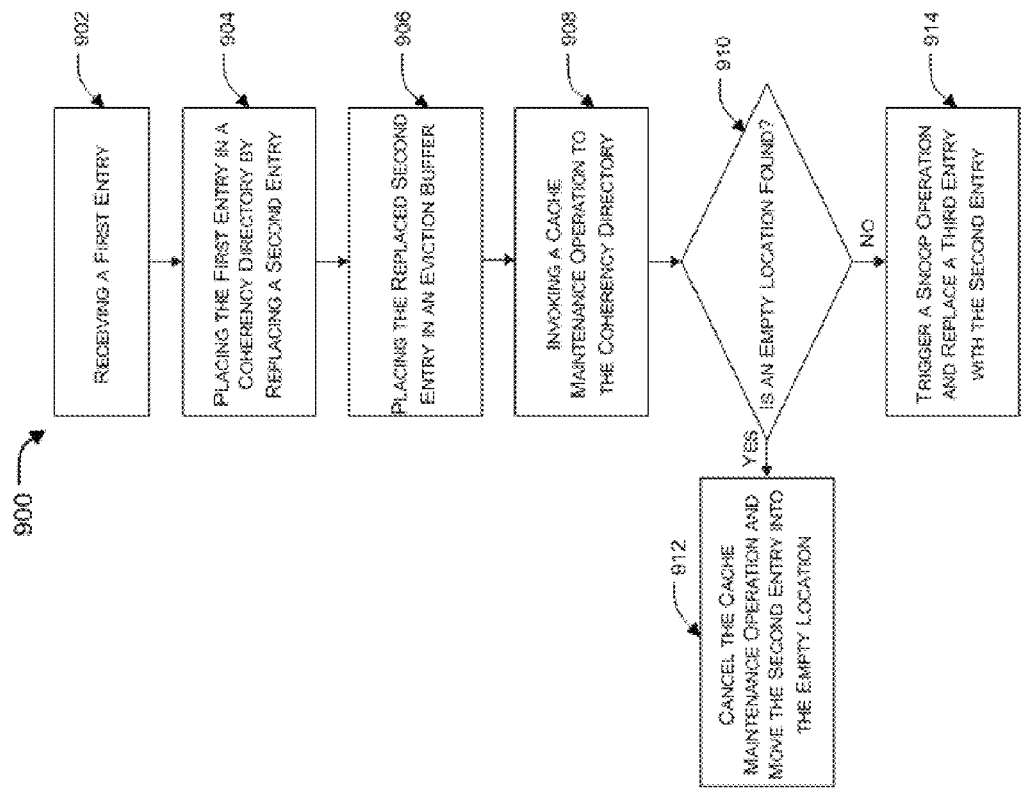
FIG. 9 illustrates another flow diagram in accordance with an example implementation of the present disclosure.

FIG. 9 illustrates another flow diagram 900 in accordance with an example implementation of the present disclosure. At 902, a first entry to be placed in a coherency directory is received, which, at 904, is placed into the coherency directory by replacing, say a second entry. At 906, the replaced second entry is moved to an eviction buffer. At 908, a cache maintenance operation can be invoked for the coherency directory, wherein at 910, it is determined as to whether an empty location is found for placement of the second entry. At 912, in case an empty location is found, the cache maintenance operation can be cancelled and the second entry can be moved to the empty location. At 914, in case an empty location is not found, a snoop operation can be triggered to replace a third entry with the second entry.

Figure 10:
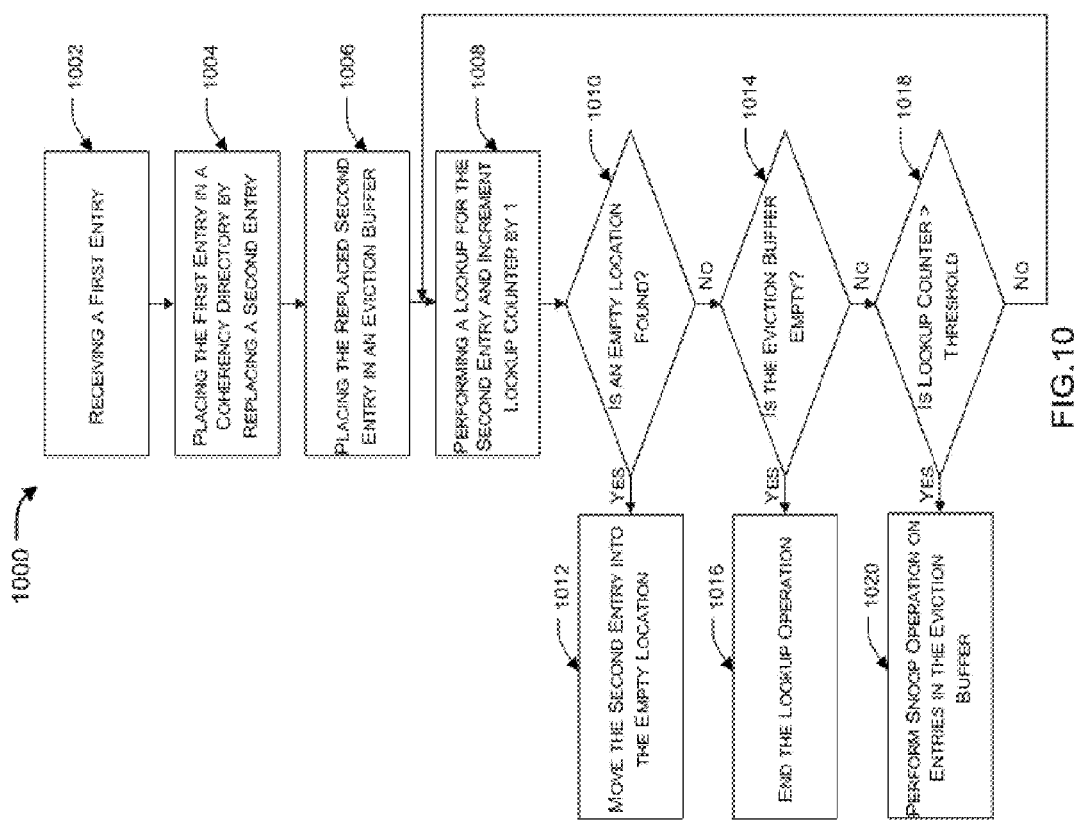
FIG. 10 illustrates yet another flow diagram in accordance with an example implementation of the present disclosure.

FIG. 10 illustrates another flow diagram 1000 in accordance with an example implementation of the present disclosure. At 1002, a first entry to be placed in a coherency directory is received, which, at 1004, is placed into the coherency directory by replacing, say a second entry. At 1006, the replaced second entry is moved to an eviction buffer and at 1008, a lookup operation for the second entry is performed. A counter can also be initiated and incremented every time a lookup is performed, wherein at 1010, it is determined whether an empty location is found for the second entry. In case such a location is identified, the second entry, at 1012, can be moved to the empty location, whereas, in case such a location is not identified, it is determined, at 1014, if the eviction buffer is empty. In case the eviction buffer is empty, the lookup operation, at 1016 is closed/stopped, whereas, in case the eviction buffer is not empty, it is determined, at 1018, whether the counter for the number of times the lookup operation has been computed is greater than a defined threshold. In case the counter is greater than the threshold, a snoop operation is performed on the entries in the eviction buffer, else, the step of performing the lookup is continued at 1008.

These algorithmic descriptions and symbolic representations are the means used by those skilled in the data processing arts to most effectively convey the essence of their innovations to others skilled in the art. An algorithm is a series of defined operations leading to a desired end state or result. In the example implementations, the operations carried out require physical manipulations of tangible quantities for achieving a tangible result.

Moreover, other implementations of the present application will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the application being indicated by the following claims.

What is claimed is:

1. A method, comprising:
managing a coherency directory for a cache coherent system, the coherency directory comprising a plurality of entries arranged in a cuckoo hash;
for a new entry for the coherency directory causing a replacement of one of the plurality of entries in the coherency directory:
placing the replaced one of the plurality of entries into an eviction buffer; and
attempting to reinsert the replaced one of the plurality of entries into a different position within the coherency directory;
wherein the attempting to reinsert the replaced one of the plurality of entries comprises:
invoking a clean invalid operation to the coherency directory;
for the clean invalid operation finding an empty location in the coherency directory for the replaced one of the plurality of entries, canceling the clean invalid operation and moving the replaced one of the plurality of entries into the empty location;
for the clean invalid operation not finding an empty location in the coherency directory for the replaced one of the plurality of entries, removing one or more of the plurality of entries through a snoop operation triggered by the clean invalid operation.

2. The method of claim 1, wherein the coherency directory is larger than a total cache capacity of the cache coherent system.

3. The method of claim 1, wherein the attempting to reinsert the replaced one of the plurality of entries comprises:
performing a lookup on the replaced one of the plurality of entries;
for the lookup having a response of another one of the plurality of entries that is not the new entry; replacing the another one of the plurality of entries with the replaced one of the plurality of entries and placing the another one of the plurality of entries into the eviction buffer.

4. The method of claim 3, wherein the performing the lookup is done once during a spare cycle during management of the cache coherent system.

5. The method of claim 3, wherein the performing the lookup is forced based on an algorithm.

6. The method of claim 1, wherein a lookup is performed on an entry in the eviction buffer for a multiple number of times until an empty entry is found or the eviction buffer being empty, the number of times subject to a limit;
for the empty entry being found, placing the entry in the eviction buffer into the empty entry;
for the empty entry not being found and the number of times not exceeding the limit; replacing an entry corresponding to the lookup with the entry in the eviction buffer, and placing the entry corresponding to the lookup into the eviction buffer; and for the eviction buffer not being empty and the number of times exceeding the limit, triggering a snoop operation on entries in the eviction buffer.

7. The method of claim 6, wherein the limit is a fixed limit.

8. The method of claim 6, wherein the limit is set proportionally to a capacity of the eviction buffer.

9. The method of claim 1, wherein the attempting to reinsert the replaced one of the plurality of entries comprises:

performing a single lookup on the replaced one of the plurality of entries;

for the lookup having a response of another one of the plurality of entries that is an empty location; placing the replaced one of the plurality of entries into the another one of the plurality of entries.

10. A controller of a cache coherent system configured to:

manage a coherency directory for the cache coherent system, the coherency directory comprising a plurality of entries arranged in a cuckoo hash;

for a new entry for the coherency directory causing a replacement to one of the plurality of entries in the coherency directory:

place the replaced one of the plurality of entries into an eviction buffer; and attempt to reinsert the replaced one of the plurality of entries into a different position within the coherency directory;

wherein the controller is configured to attempt to reinsert the replaced one of the plurality of entries by:

invoking a clean invalid operation to the coherency directory;

for the clean invalid operation finding an empty location in the coherency directory for the replaced one of the plurality of entries, canceling the clean invalid operation and moving the replaced one of the plurality of entries into the empty location;

for the clean invalid operation not finding an empty location in the coherency directory for the replaced one of the plurality of entries, removing one or more of the plurality of entries through a snoop operation triggered by the clean invalid operation.

11. The controller of claim 10, wherein the coherency directory is larger than a total cache capacity of the cache coherent system.

12. The controller of claim 10, wherein the controller is configured to attempt to reinsert the replaced one of the plurality of entries by:

performing a lookup on the replaced one of the plurality of entries;

for the lookup having a response of another one of the plurality of entries that is not the new entry; replacing the another one of the plurality of entries with the replaced one of the plurality of entries and placing the another one of the plurality of entries into the eviction buffer.

13. The controller of claim 12, wherein the controller is configured to perform the lookup by conducting the lookup once during a spare cycle during management of the cache coherent system.

14. The controller of claim 12, wherein the controller is configured to perform the lookup based on an algorithm.

15. The controller of claim 10, wherein the controller is configured to perform a lookup an entry in the eviction buffer for a multiple number of times until an empty entry is found or the eviction buffer being empty, the number of times subject to a limit;

for the empty entry being found, placing the entry in the eviction buffer into the empty entry;

for the empty entry not being found and the number of times not exceeding the limit; replacing an entry corresponding to the lookup with the entry in the eviction buffer, and placing the entry corresponding to the lookup into the eviction buffer; and for the eviction buffer not being empty and the number of times exceeding the limit, triggering a snoop operation on entries in the eviction buffer.

16. The controller of claim 15, wherein the limit is a fixed limit.

17. The controller of claim 15, wherein the limit is set proportionally to a capacity of the eviction buffer.

18. The controller of claim 10, wherein the controller is configured to attempt to reinsert the replaced one of the plurality of entries by:

performing a single lookup on the replaced one of the plurality of entries;

for the lookup having a response of another one of the plurality of entries that is an empty location; placing the replaced one of the plurality of entries into the another one of the plurality of entries.

* * * * *